United States Patent
Newson et al.

(10) Patent No.: US 6,320,898 B1
(45) Date of Patent: Nov. 20, 2001

(54) CDMA PSEUDO-SMART ANTENNA SELECTION

(75) Inventors: Paul Newson, Kanata; Frank Martin van Heeswyk, Nepean, both of (CA)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/201,021

(22) Filed: Nov. 30, 1998

(51) Int. Cl.[7] .............................. H04B 15/00; H04K 1/00; H04L 27/30

(52) U.S. Cl. ...................... 375/144; 375/146; 455/562; 455/277.2

(58) Field of Search .................................. 375/140, 141, 375/142, 144, 133, 227, 260, 267, 367, 148, 150; 455/561, 562, 132, 133, 134, 135, 227.1, 277.2

(56) References Cited

U.S. PATENT DOCUMENTS

| | | | |
|---|---|---|---|
| 6,009,124 | * 12/1999 | Smith et al. | 375/267 |
| 6,091,788 | * 7/2000 | Keskitalo et al. | 375/347 |
| 6,128,476 | * 10/2000 | Fujita | 455/101 |
| 6,134,261 | * 10/2000 | Ryan | 375/141 |
| 6,212,406 | * 4/2001 | Keskitalo et al. | 455/562 |

* cited by examiner

*Primary Examiner*—Chi Pham
*Assistant Examiner*—Phuong Phu
(74) *Attorney, Agent, or Firm*—Cobrin & Gittes (57) ABSTRACT

A CDMA base station servicing a plurality of mobile stations in a plurality of sectors monitors the reverse-link signal strength received by each antenna for each mobile station, and accordingly determines an optimum combination of antennas for forward-link transmission to each mobile station, whereby transmission to each mobile station may be accomplished with lower power, and whereby the dropped-call rate is reduced.

14 Claims, 8 Drawing Sheets

Fig. 1

(PRIOR ART)

Fig. 2

(PRIOR ART)

CDMA PSEUDO-SMART ANTENNA SELECTION

FIELD OF THE INVENTION

The invention relates to selection of antennas by a CDMA base station, and particularly to a rapid way of determining in the base station, for each of a plurality of mobile stations, a combination of antennas for optimal communication with that mobile station.

BACKGROUND OF THE INVENTION

Code-division multiple access (CDMA) radio systems are well known. See, generally, CDMA (Cellular Mobile Communicaitions and Network Secrity, Dr. Man Young Rhee, Prentice Hall 1998, ISBN 0-13-598418-1, and standard TIA/EIA/IS-95, hereinafter "IS-95".

In a typical CDMA system, a base station services a plurality of mobile stations in a predetermined geographical area, which in turn is divided into sectors. The sectors are arranged radially from the base station, which is nominally centrally located within the predetermined geographical area. The base station has a plurality of antennas, several (typically two) being deployed to service each sector. The antennas within each sector typically comprise a main antenna and a "diversity" antenna.

Figure 1:
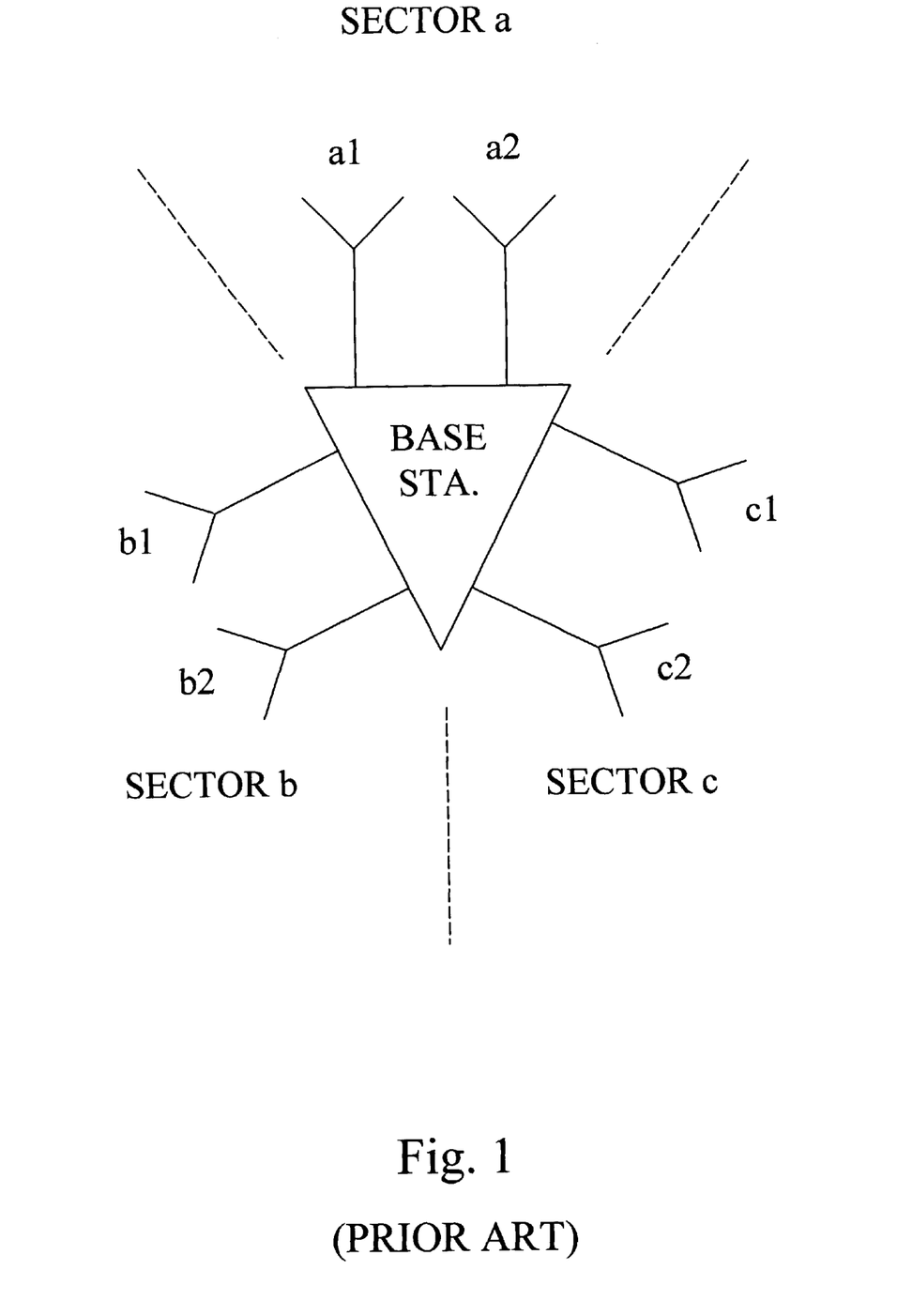
FIG. 1 depicts a typical base station serving three sectors with two antennas in each sector.

FIG. 1 depicts such a base station configuration. It is assumed for purposes of illustration that the base station serves three sectors (denoted a, b, and c) and that there are two antennas within each sector: a main antenna (a1, for example) and a diversity antenna (a2, for example). This is a typical configuration, but those skilled in the art realize that other numbers of sectors and other numbers of antennas per sector may be employed. Those skilled in the art also realize that although an antenna is nominally associated with a particular sector, its coverage may overlap into adjacent sectors.

Figure 2:
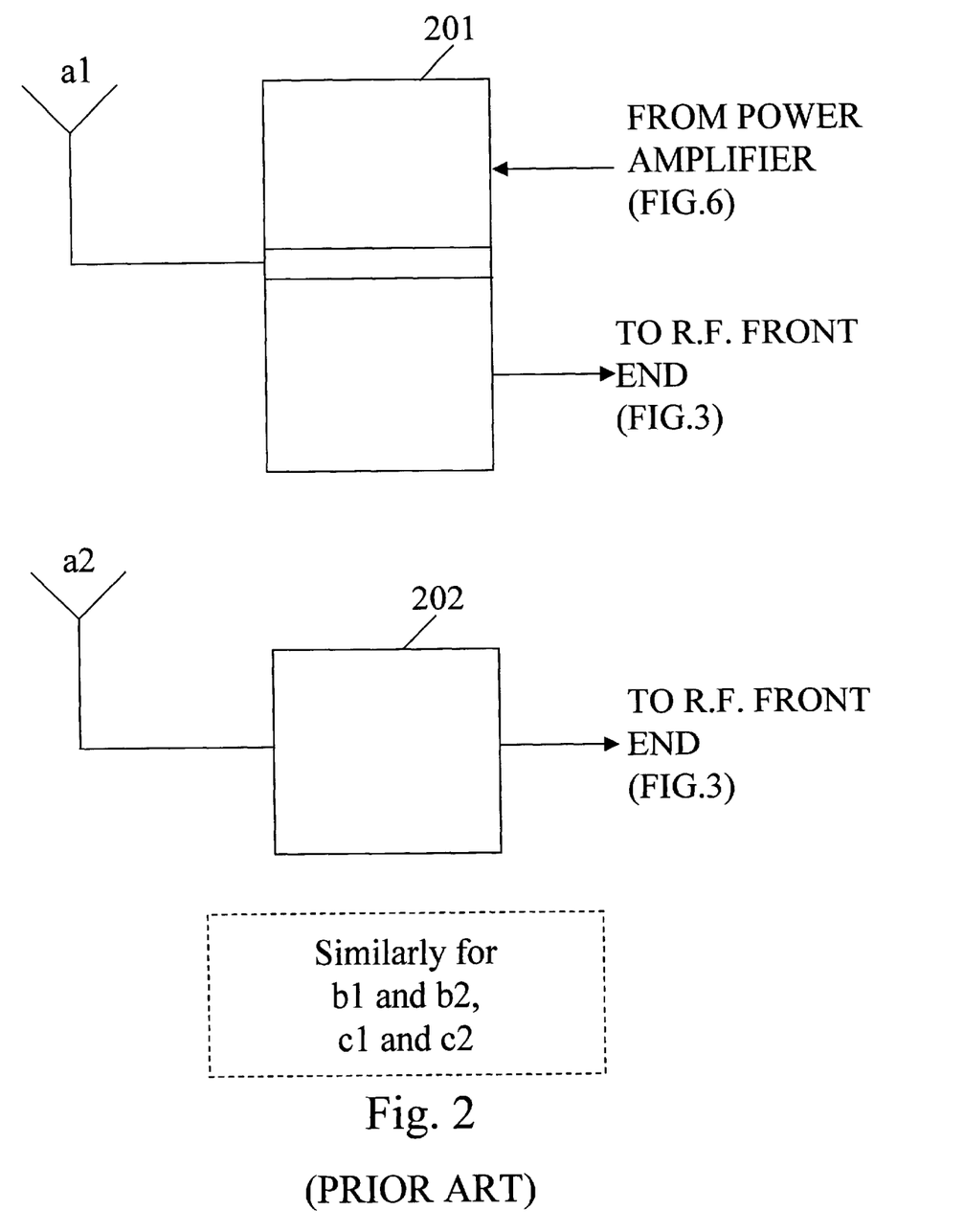
FIG. 2 is a high-level schematic diagram showing the connection of the base station's antennas to other portions of the base station.

FIG. 2 shows that within a base station a duplexer 201 is connected to the main antenna to connect it to the output of the power amplifier for transmission to mobile stations ("forward link") and to an RF front end for reception from mobile stations ("reverse link"). Each diversity antenna is connected through a preselector filter 202 to an RF front end for reverse-link reception, and is not used in the present example for forward-link transmission.

Figure 3:
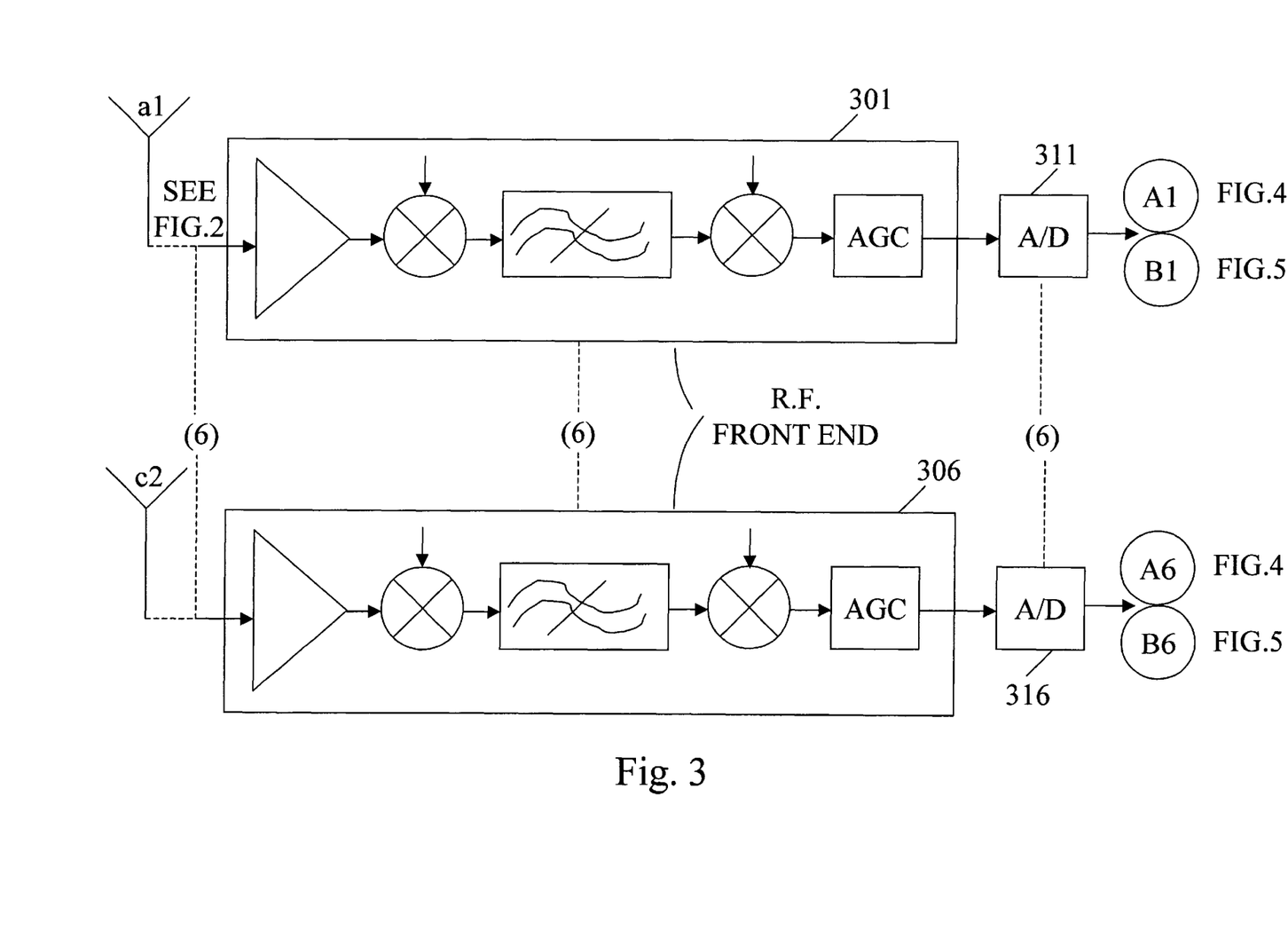
FIG. 3 is a high-level schematic diagram of the front end of the base station receiver.

FIG. 3 shows at a high level that after each RF front end converts the signal from the antenna to baseband an analog-to-digital converter is provided to convert the signal to a digital stream, which is sent to both the searcher of FIG. 4 and the rake receiver of FIG. 5, both to be described in further detail below.

Figure 8:
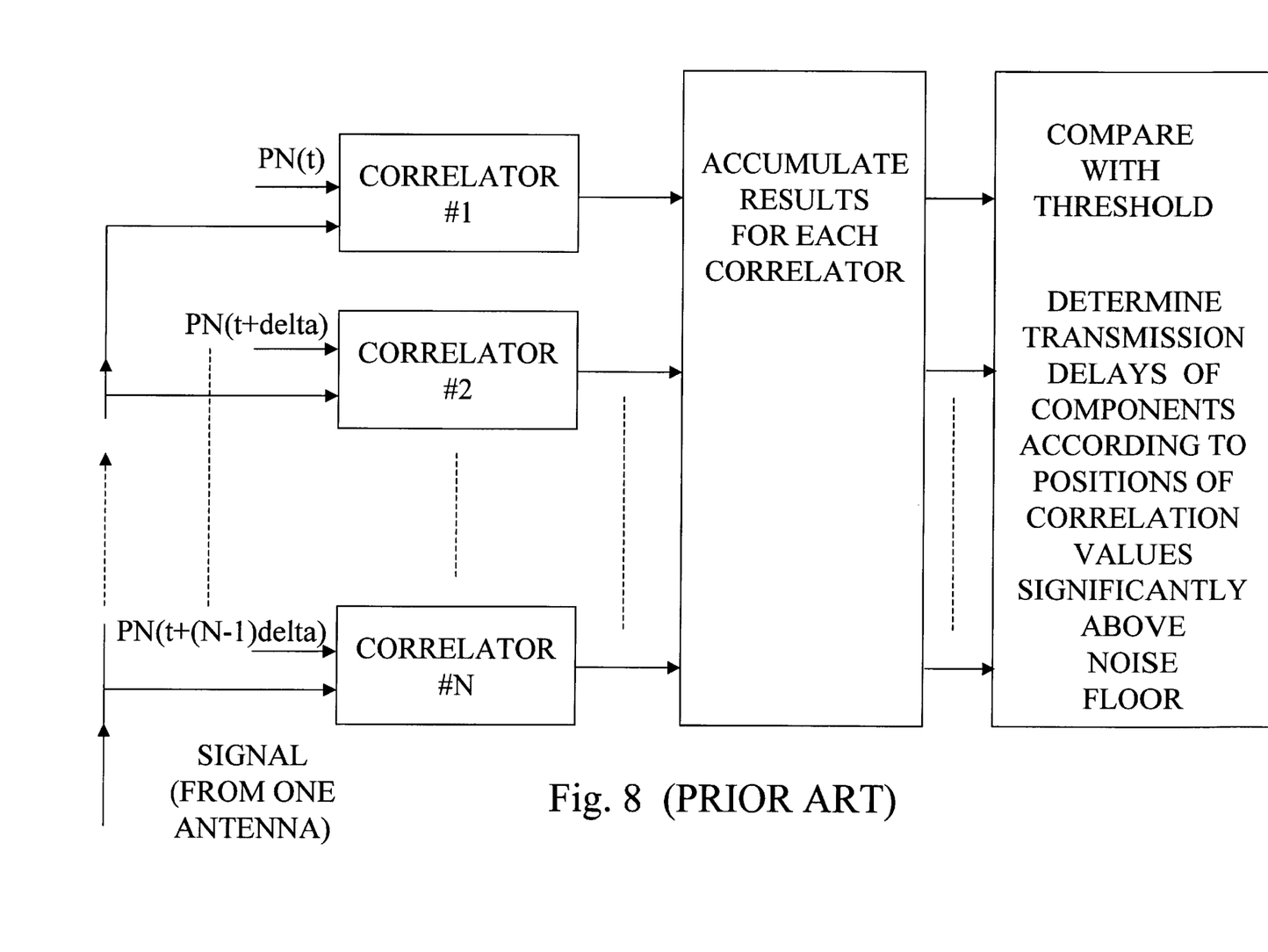
FIG. 8 is a high-level schematic diagram of a conventional searcher.

FIG. 8 depicts at a high level the prior-art functions of a searcher. The signal received from the mobile station is spectrum-spread according to pseudonoise ("PN") codes, and the base station's receiver must despread it according to those same codes. The base station has code generators comparable to those "local replicas" of the spreading codes, but they must be synchronized with the codes embedded in the signal, and the signal has undergone an unknown amount of transmission delay. It is the primary function of the searcher to determine the amount of transmission delay in order to synchronize the local replicas with the received signal. As FIG. 8 shows the received signal is correlated against the PN codes as delayed by varying amounts and the correlation results are accumulated. A correlation result significantly greater than the noise floor indicates that the transmission delay equals the delay of the PN code associated with that correlator.

The searcher often finds several correlation results that arc significantly greater than the noise floor; this indicates reception of multipath components of the signal. The relative delays among the components can be determined according to the PN-code delay associated with the correlator that produced each significantly greater correlation result. Therefore, CDMA base stations employ "rake receivers" to demodulate the received signal, evaluating each of the multipath components according to its delay and summing the results.

Figure 5:
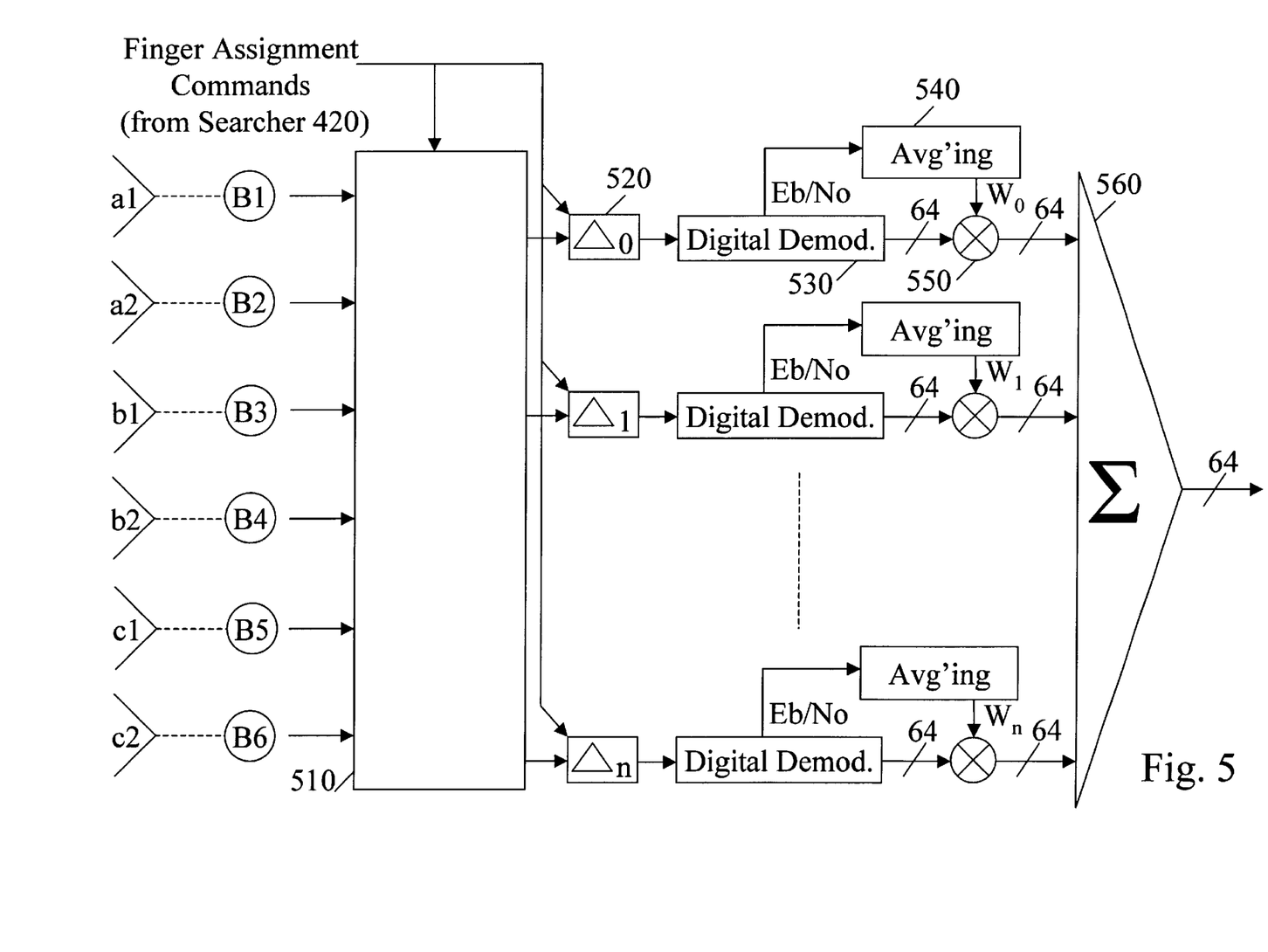
FIG. 5 depicts one of the base station's rake receivers as adapted for the present invention.

FIG. 5 depicts a rake receiver; the prior-art aspects of the one depicted include multiple digital demodulators 530, each preceded by a delay circuit 520 and followed by a weighing circuit 550. (Each such path is known as a "finger" of the rake receiver.) The delay circuits are set according the relative delays among the multipath components found by the searcher, and the outputs are summed by summer 560, thus improving the amount of intelligence recovered from each mobile station's signal. Each digital demodulator despreads the signal according to the aforementioned local replicas of the PN codes (delayed by the amount determined by the searcher), and undoes other modulations that may have been applied by the mobile station's transmitter, such as Walsh-code modulation. Long-Code spreading, etc., as known to those in the art.

Other base stations exist to service other geographical areas. The coverage areas of base stations typically overlap so that a roaming mobile station is nearly always able to communicate with some base station.

A mobile station may change his geographical position while he has a call in progress. He might move from one sector to another of the same base station, or he might move from the coverage area of one base station into that of another base station. Procedures known in the art as "handoff" procedures govern the changes in sectors or base stations as a mobile station moves around.

A mobile station is said to undergo "hard handoff" when he is handed off from one sector to another operating on a different frequency, whether on the same or another base station. He undergoes "soft handoff" when he moves from one sector into another operating on the same frequency, but on a different base station. He undergoes "softer handoff" when handed off from one sector to another operating on the same frequency on the same base station.

Under soft or softer handoff a mobile station begins communicating with the "new" antenna before he loses communication with the "old" one, and can for a time communicate with both of them.

Under hard handoff a mobile station must be instructed to switch to a new frequency band and reinitiate communication. The smooth transition of soft or softer handoff is thus not provided.

A mobile station may monitor the base station's pilot channel as transmitted by one or several base-station antennas according to a "neighbour list" (known in the art, broadcast from the base station to the mobile station). Since transmission of the pilot channel is according to a different PN code offset on each antenna, the neighbour list is essentially a set of PN offsets which the mobile is to scan. (This is in addition to a call the user may have in progress on the traffic channel.) In practice the mobile station might potentially be able to receive the pilot channel from antennas that are not on the neighbour list, or it might not be able to obtain quality reception from antennas that arc on the neighbour list.

Upon determining that the signal strength from an antenna in an additional sector exceeds a predetermined threshold value, the mobile station informs the base station (and through the base station, the base-station controller BSC)) of that fact. In response, an additional channel is set up on the new sector. The mobile station is then able to communicate with several sector antennas, which may be on different base stations, simultaneously. If the mobile station is in communication with several antennas on the same base station, it is said to be in the softer handoff state.

Those skilled in the art of CDMA communications recognize that a base station operates under a "power budget": a base station services a large number of mobile stations, but must do so within an available total amount of power. Accordingly, transmission to each mobile station is carried out with the lowest practical power so that servicing of all the mobile stations can be accomplished within the power budget. CDMA systems therefore provide for increasing or decreasing power dynamically to facilitate maintaining the lowest practical power on each transmission.

The conventional scheme for softer handoff, which relies on assessment by and request from a mobile station, is inherently slow. This means that for a relatively long time communication with a mobile station is taking place over the "old" antenna, which is not as effective for reaching the mobile's present location as the "new" antenna, and which must therefore be operated at higher power, which is detrimental to the power budget.

Accordingly, there exists a need for a CDMA base station to assess the propagation over the paths associated with each of its antennas for each of the current mobile stations, and for the CDMA base station to determine the optimum antenna configuration for transmission to each of the mobile stations.

It is thus an object of the present invention to provide a CDMA base station that assesses quality of propagation to each mobile station through each antenna.

It is a further object of the present invention to provide a CDMA base station that adjusts selection of antennas for transmission to each mobile station so as to optimize transmission to each mobile station.

It is a further object of the present invention to provide a CDMA base station that minimizes power output for transmission to mobile stations.

SUMMARY OF THE INVENTION

These and other objects may be accomplished by the present invention's systems and methods of calculating the signal-to-noise ratio (SNR) for each mobile station as received over the reverse link on each of the antennas, time-averaging the reverse-link SNRs, and selecting antennas for forward-link transmission to each mobile station according to the magnitudes of the time-averaged reverse-link SNRs for that mobile station.

In one practice of the invention, those antennas whose SNR's exceed a predetermined threshold are selected.

In further practice of the invention the SNR's are determined from the correlation values in the searcher, known in the prior art for determining the transmission delay for each mobile station as received on each antenna. In another practice, the SNR's are determined in the receiver for each multi-path component of each signal from each mobile station over each antenna, and the component SNR's are in turn averaged.

The invention will next be described in connection with certain exemplary embodiments, however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

The following describes how the invention provides a CDMA base station that assesses quality of propagation to each mobile station through each antenna, adjusts selection of antennas for transmission to each mobile station so as to optimize the transmission, and minimizes power usage.

The base station depicted in FIG. 1, with its three sectors denoted a, b, and c, and two antennas in each sector denoted x1 and x2, where x identifies the sector, will be treated as exemplary for this discussion. Those skilled in the art will appreciate that other configurations can be employed and are within the scope of the invention.

As FIG. 2 shows, each main antenna (a1, b1, and c1) is connected to a duplexer 201 which connects the antenna to transmitter and receiver portions of the base station, while each auxiliary antenna (a2, b2, and c2) is connected to a preselect filter 202 and thence only to receiver portions of the base station. FIG. 3 depicts R.F. demodulators 301 through 306 (one for each antenna) which convert the signal received from the base station from R.F. carrier frequency to baseband, and samplers (A/D converters) 311 through 316 which convert the baseband signal to a digital data stream.

Figure 4:
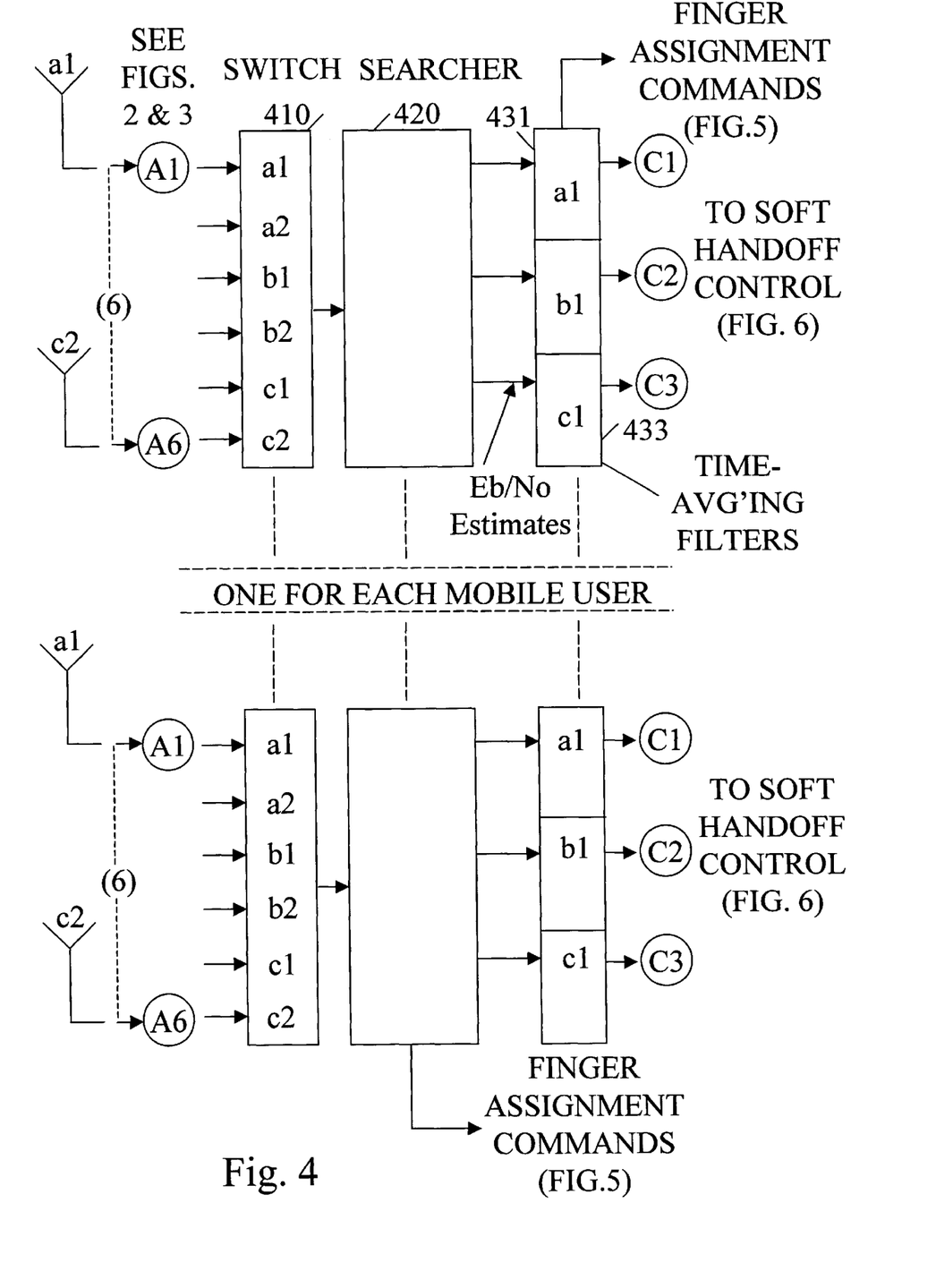
FIG. 4 depicts the base station's searchers and associated units as adapted for the present invention.

FIG. 4 shows that there is a searcher 420 provided for each mobile station, and associated with each is a switch 410 so that the input to a searcher 420 can be the digital data stream derived from the radio signal from any of the six antennas, the signals from each antenna being searched one at a time.

Figure 7A:
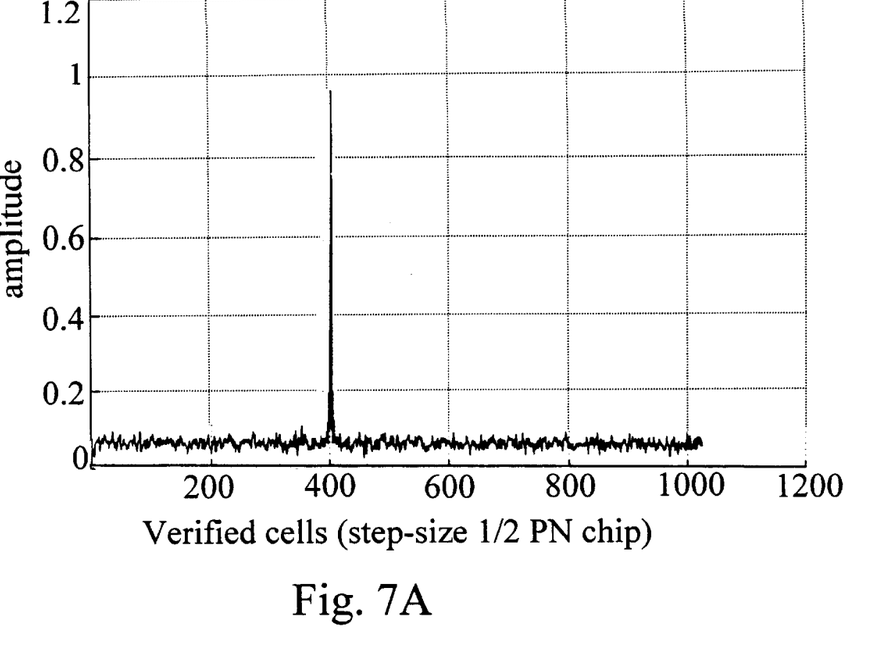
FIGS. 7A and 7B are graphs of exemplary correlation values produced by a CDMA searcher.

According to the present invention, each searcher 420, in addition to performing the conventional functions of a searcher (determining transmission delay and relative delay among multipath components) also computes values of Eb/No (energy per bit divided by noise, a well known signal-to-noise ratio (SNR)) for each multipath component on each antenna. FIG. 7A shows a plot of exemplary correlation values produced in the searcher for a particular mobile stations's signal for a particular antenna. There is a significantly higher value for the 400th correlation value (with its magnitude normalized to a value of 1). Since the exemplary searcher correlates against PN-code possibilities one-half PN chip apart, it is here determined that the transmission delay is 200 PN-chip durations. The Eb/No value is calculated as the ratio of the peak correlation value to the average value of the "noise floor", i.e. all the other correlation values evaluated in the same normalization that assigned the peak correlation value a value of 1.

Figure 7B:
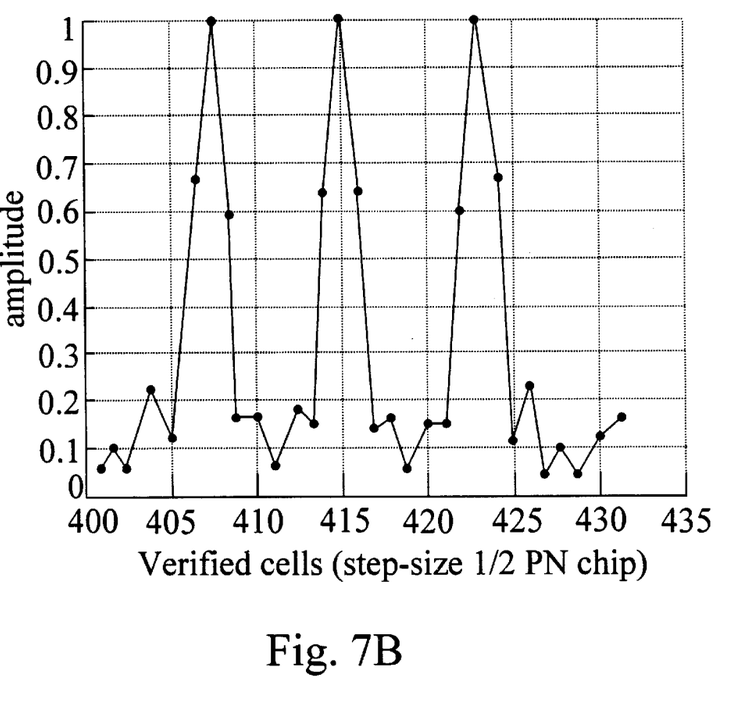

FIG. 7B shows another exemplary set of correlation values from a searcher, over the range 400 to 435 PN-code possibilities. Three peak values are found in this case, at 407, 415, and 423 steps, corresponding to transmission delays of 203.5, 207.5, and 211.5 PN-chip durations. (It is a coincidence that the three peaks have nearly the same magnitude.) A composite Eb/No is calculated for all the components from each antenna.

A composite Eb/No for the two antennas in each sector is then determined, and the three composite Eb/No values are each input to one of three time-averaging filters 431–433. It has been found that time averaging should be performed over a period of at least 10 milliseconds. In one embodiment of the invention, the outputs of filters 431–433 may be used to control antenna selection for transmission to the mobile station.

The data streams shown leaving FIG. 3 are also input to rake receivers (FIG. 5), of which one is provided for each mobile station. Rake receivers are well known in the art, and consist of a number of "fingers" all feeding into a summer. The number of fingers is a design choice, and is typically three to five. Each finger operates on one multipath component of a received signal. Each finger consists of a delay circuit 520, a digital demodulator 530, and a weighing circuit 550 (a multiplier controlled by a weighing coefficient). The fingers are configured to the appropriate antenna and delay amount by the finger assignment commands issued by searcher 420. This includes controlling switch 510 to control the connection of data streams to fingers (some of the antennas would not receive sufficient signal from the mobile station, and thus would not result in the searcher's finding a suitable correlation value, and would not be used), setting the delay circuits (according to the relative delays among multipath components), and setting the weighing coefficients (according to the SNR of each component). FIG. 5 depicts an alternative means of setting the weighing coefficients through averaging circuits 540, to be discussed below.

Because the signal sent from the mobile station was modulated by Walsh codes, the digital demodulators in the fingers typically contain Fast Hadamard Transform (FHT) capabilities for the corresponding demodulation. The FHT typically outputs sixty-four correlation values. An Eb/No value for the component being processed by the finger can be determined from the ratio of the maximum correlation value to the "noise floor" of the other correlation values. Time averages of these component-specific SNR values (produced by averaging means 540) may, if desired, be used to determine the weighing coefficients, as is depicted in FIG. 5. This may be more accurate than using the values obtained from the searcher.

Figure 6:
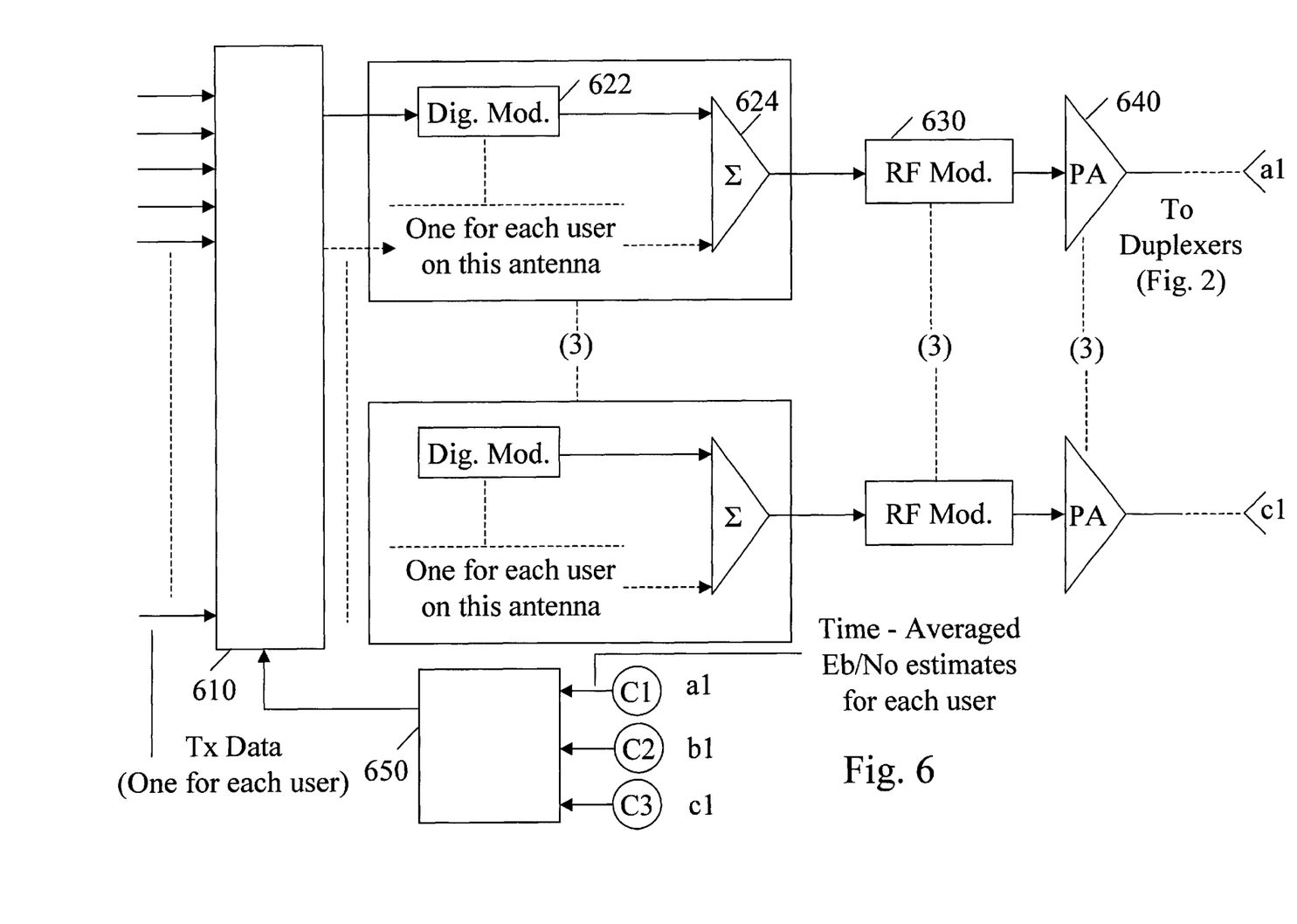
FIG. 6 depicts the paths for delivering forward-link transmission data to the base station s antennas according to the present invention.

FIG. 6 depicts a portion of the base station pertinent to forward-link transmission. i.e., transmission to the mobile stations. There is a digital modulator bank 620 for each sector of the base station (three in the present example). Each digital modulator bank 620 contains a number of digital modulators 622. One digital modulator 622 is provided for each user who might be in the associated one of the sectors. Those skilled in the art will understand that the digital modulator applies power control and the Long Code. Walsh modulation, and PN quadrature codes to the user data stream. The outputs of all the digital modulators 622 in a digital modulator bank 620 (i.e., for a particular sector) are summed by a summer 624.

A switch 610 receives each of the data streams that are to be sent out. Under control of handoff controller 650, switch 610 switches each user data stream to an appropriate one of digital modulators 622, according to the antenna that handoff controller 650 has selected for that user's intended mobile station.

Handoff controller 650 selects the optimum antenna combination for forward-link transmission to each mobile station according to the quality of recent reverse-link reception from that mobile station. For each mobile station, the time-averaged SNR's for each of the sectors are input to handoff controller 650. As mentioned, in alternative embodiments of the invention, these may come from searcher 420 of FIG. 4, or by averaging for each antenna the outputs of averaging circuits 540 in the rake receiver of FIG. 5.

One practice of the invention applies to a mobile station which is already in the softer handoff condition, i.e., the mobile station has requested softer handoff and is in communication with two or more antennas on the same base station and on the same frequency, as previously described. In this practice the rake receiver fingers are used to monitor the signal power received from each of the sectors with which the mobile station is in softer handoff. (These signals are time-averaged as previously described.) The averaged Eb/No's are input to the handoff controller 650, which compares them with a threshold. If the signal from any of the sectors with which the mobile is in softer handoff falls below the threshold, then switch 610 is instructed to temporarily halt forward-link communication through the modulator 622 pertinent to that sector, until the averaged value again exceeds the threshold or until the mobile station requests discontinuation of softer handoff with that sector.

However, transmission must not be halted on all of the sectors or the call will be "dropped". In the event that none of the Eb/No averages exceed the threshold, controller 650 must still instruct switch 610 to retain transmission on the sector associated with the best Eb/No, or possibly with all sectors.

In this practice, since controller 650 is doing nothing more than switching modulators with which a mobile station is already in communication, no changes are required in the IS-95 standard.

In another practice of the invention, the mobile station need not have requested to be in a softer-handoff state. A base station, upon detecting in handoff controller 650 that the mobile station's reverse-link signal exceeds a predetermined threshold in a "new" sector, initiates forward-link transmission to the mobile in the new sector by instructing switch 610 to pass the mobile's data through to a modulator 622 in the bank for the new sector. The mobile station would then have to be informed to use the transmission on the new sector in order to take advantage of the additional power; however, the present IS-95 standard does not have provision for so informing the base station. A slight modification permitting a base-station-directed softer handoff would be necessitated. Once the mobile station is in the softer handoff mode with the new sector, operation would be as in the previously discussed practice of the invention.

The output of each digital modulator bank 620 is input to an RF modulator 630, which converts the baseband signal from digital modulator bank 620 to the base station's allotted RF band for air-link transmission. The RF signal is amplified by power amplifier 640, and forwarded to duplexers 201 (FIG. 2) for delivery to the respective main antennas for the respective sectors.

It will thus be seen that the invention efficiently attains the objects set forth above, among those made apparent from the preceding, description. In particular, the invention assesses the quality of the path between each mobile station and each sector of the base station according to the quality of reception of each mobile station by each antenna, and dynamically selects antennas for transmission to the mobile stations accordingly. Those skilled in the art will appreciate that the configuration depicted in FIGS. 4, 5, and 6 enable such dynamic selection, thus minimizing the time that transmission is conducted via antennas that are not the optimum ones, and thus optimizing the power budget of the base station.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a two-way radio system including a base station and a plurality of mobile stations the base station having a plurality of differently-oriented antennas for transmitting on forward links to the mobile stations and for receiving on reverse links from the mobile stations:
    forward-link antenna selection apparatus for selecting antennas to use for forward link transmissions to each of the mobile stations, comprising:
        signal evaluation means for determining signal-to-noise ratio (SNR) for each mobile station of signals received on the reverse link via each of the antennas, time-averaging means for time-averaging the SNR's; and
        selection means for selecting antennas for forward-link transmission to each mobile station according to the time-averaged reverse-link SNR's for that mobile station according to a predetermined criterion.

2. The forward-link antenna selection apparatus recited in claim 1 wherein in the selection means the predetermined criterion is to select the antenna exhibiting a highest time-averaged reverse-link SNR.

3. The forward-link antenna selection apparatus recited in claim 1 wherein in the selection means the predetermined criterion is to select all the antennas for which the time-averaged reverse-link SNRs exceed a predetermined threshold.

4. The radio system recited in claim 1 wherein the radio system is a CDMA radio system in which:
    transmissions are spectrum-spread according to at least one binary sequence; and
    the base station includes at least one searcher for determining transmission delay of the radio system in terms of binary sequence chip durations for each mobile station for each antenna, the searcher producing a series of correlation values each corresponding to a different transmission delay, and selecting a correlation value corresponding to the transmission delay having a greater magnitude than other correlation values,
    and wherein in the forward-link antenna selection apparatus said signal evaluation means comprises means for determining a ratio of the correlation value having said greater magnitude to an average of said other correlation values.

5. The radio system recited in claim 1 wherein:
    the base station includes at least one rake receiver having at least two fingers in which each multipath component of a reverse-link transmission from a mobile station is input to a finger and each finger includes a delay circuit to account for a relative delay among multipath components;
    the reverse-link transmission is orthogonally modulated;
        each said finger includes an orthogonal demodulator which outputs a series of correlation values each corresponding to a different demodulated code, and selects a correlation value corresponding to a transmitted code having greater magnitude than other correlation values,
    and wherein in the forward-link antenna selection apparatus said signal evaluation means comprises:
        means for determining in each finger a finger SNR as a ratio of the correlation value having said greater magnitude to an average of said other correlation values;
        means in each finger for time-averaging said finger SNR; and
        means for averaging for each antenna the time-averaged finger SNRs corresponding to transmission components received via that antenna.

6. The radio system recited in claim 5 wherein the orthogonal demodulator performs a Hadamard Transform to produce said series of correlation values.

7. The radio system recited in claim 6 wherein the orthogonal modulation is Walsh-code modulation.

8. In a two-way radio system including a base station and a plurality of mobile stations, the base station having a plurality of differently-oriented antennas for transmitting on forward links to the mobile stations and for receiving on reverse links from the mobile stations,
    a method of selecting antennas to use for the forward link transmissions to each of the mobile stations comprising the steps of:
        determining, signal-to-noise ratio (SNR) for each mobile station of signals received on the reverse link via each of the antennas;
        time-averaging the SNR's; and
        selecting antennas for forward-link transmission to each mobile station according to the time-averaged reverse-link SNR's for that mobile station according to a predetermined criterion.

9. The method recited in claim 8 wherein the predetermined criterion is to select the antenna exhibiting a highest time-averaged SNR.

10. The method recited in claim 8 wherein the predetermined criterion is to select all the antennas for which the time-averaged SNRs exceed a predetermined threshold.

11. The method recited in claim 8 practiced in a radio system which is a CDMA radio system in which:
    transmissions are spectrum-spread according to at least one binary sequence; and
    the base station includes at least one searcher for determining transmission delay of the radio system in terms of binary sequence chip durations for each mobile station for each antenna, the searcher producing a series of correlation values each corresponding to a different transmission delay, and selecting a correlation value corresponding to the transmission delay having a greater magnitude than other correlation values, wherein the method step of determining the SNR comprises determining a ratio of the correlation value having said greater magnitude to an average of said other correlation values.

12. The method recited in claim 8 practiced in a radio system in which:

the base station includes at least one rake receiver having at least two fingers in which each multipath component of a reverse-link transmission from a mobile station is input to a finger and each finger includes a delay circuit to account for the relative delay among multipath components;

the reverse link transmission is orthogonally modulated;

the finger includes an orthogonal demodulator which outputs a series of correlation values each corresponding to a different demodulated code, and selects a correlation value corresponding to a transmitted code having greater magnitude than other correlation values, wherein the method step of determining the SNR for each mobile station for each antenna comprises:

determining in each finger a finger SNR as a ratio of the correlation value having said greater magnitude to an average of said other correlation values;

averaging for each antenna the finger SNRs corresponding to transmission components received via that antenna.

13. The method recited in claim 12 wherein the orthogonal demodulator performs a Hadamard Transform to produce said series of correlation values.

14. The method recited in claim 13 wherein the orthogonal modulation is Walsh-code modulation.

* * * * *